March 9, 1965  C W. MUSSER  3,172,299
POWER STEERING

Filed June 5, 1962  4 Sheets-Sheet 1

Inventor
C Walton Musser
By his Attorney

March 9, 1965 C W. MUSSER 3,172,299
POWER STEERING
Filed June 5, 1962 4 Sheets-Sheet 3
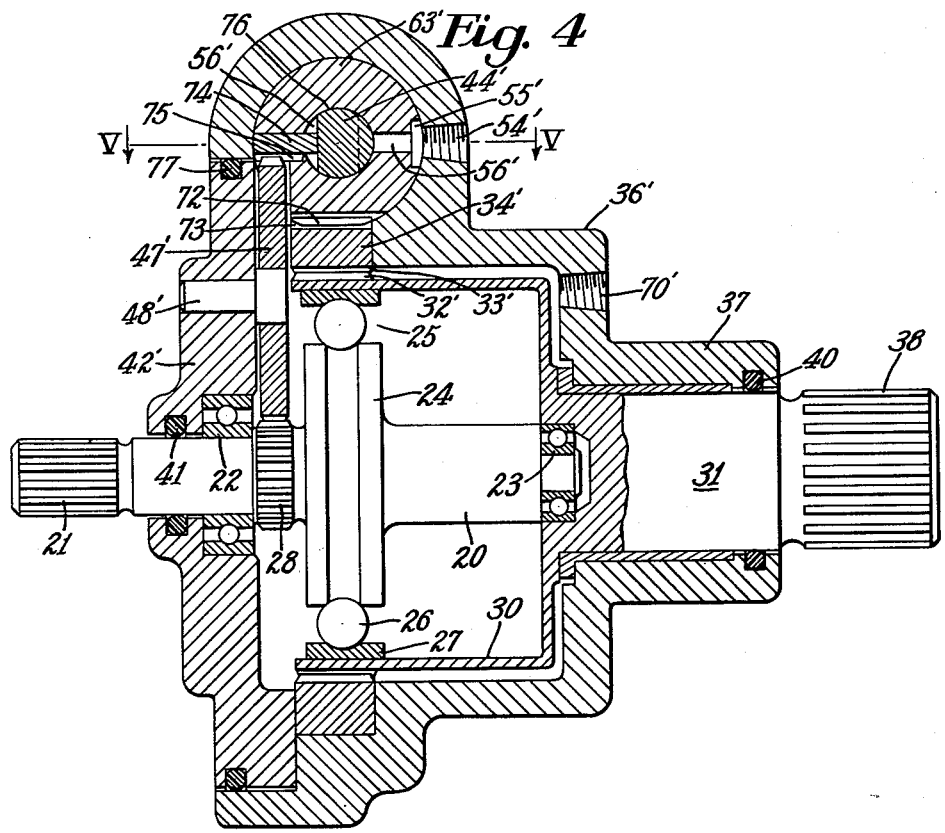
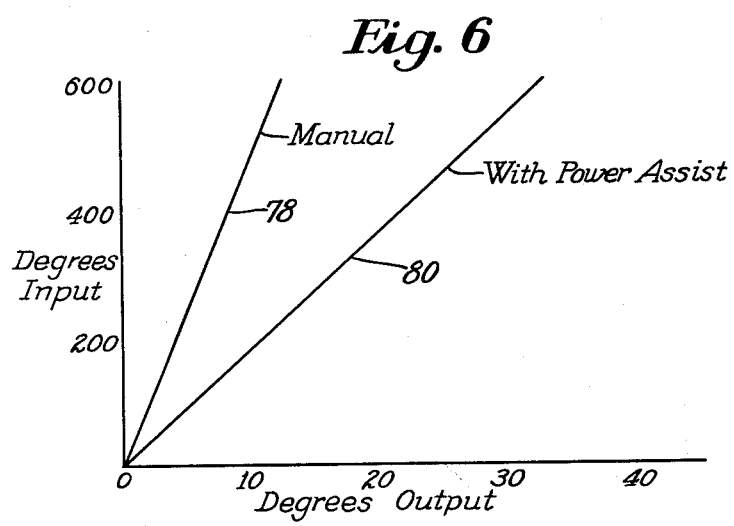

March 9, 1965  C W. MUSSER  3,172,299
POWER STEERING

Filed June 5, 1962  4 Sheets-Sheet 4

3,172,299
POWER STEERING
C Walton Musser, Palos Verdes Estates, Calif., assignor to United Shoe Machinery Corporation, Boston, Mass., a corporation of New Jersey
Filed June 5, 1962, Ser. No. 200,132
9 Claims. (Cl. 74—388)

The present invention relates to power steering devices of the character which are particularly suited to use on automobiles, trucks and the like.

A purpose of the invention is to alter the mechanical ratio of a gearing device to a lower value by power means for power steering.

A further purpose is to make it possible to steer a vehicle equipped with a power steering device by the application of the same amount of torque whether the tractive power is on or whether the power fails, employing a considerably greater amount of motion when the power application is inoperative than when the power application is operative.

A further purpose is to obtain a true road feel which is directly proportional to the road condition on a power steering device whether the power is turned on or is turned off.

A further purpose is to employ a normally stationary gear in a gearing device of a power steering device and to turn a normally stationary gear by fluid actuated means, in response to motion of the input, in a direction which will increase output motion.

A further purpose is to actuate the normally stationary gear by fluid cylinder means interconnected to a gear which means is controlled by valve means intergeared with the input shaft.

A further purpose is to utilize circularly acting fluid cylinder means or tangentially acting fluid cylinder means as desired.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 4 is an axial section of a modified power steering device of the invention using a different type piston.

FIGURE 6 is a graph plotting degrees input as ordinate and degrees output as abscissa, and showing the relative amount of motion between manual and power assistance operations in the power steering device of the invention.

Figure 1:
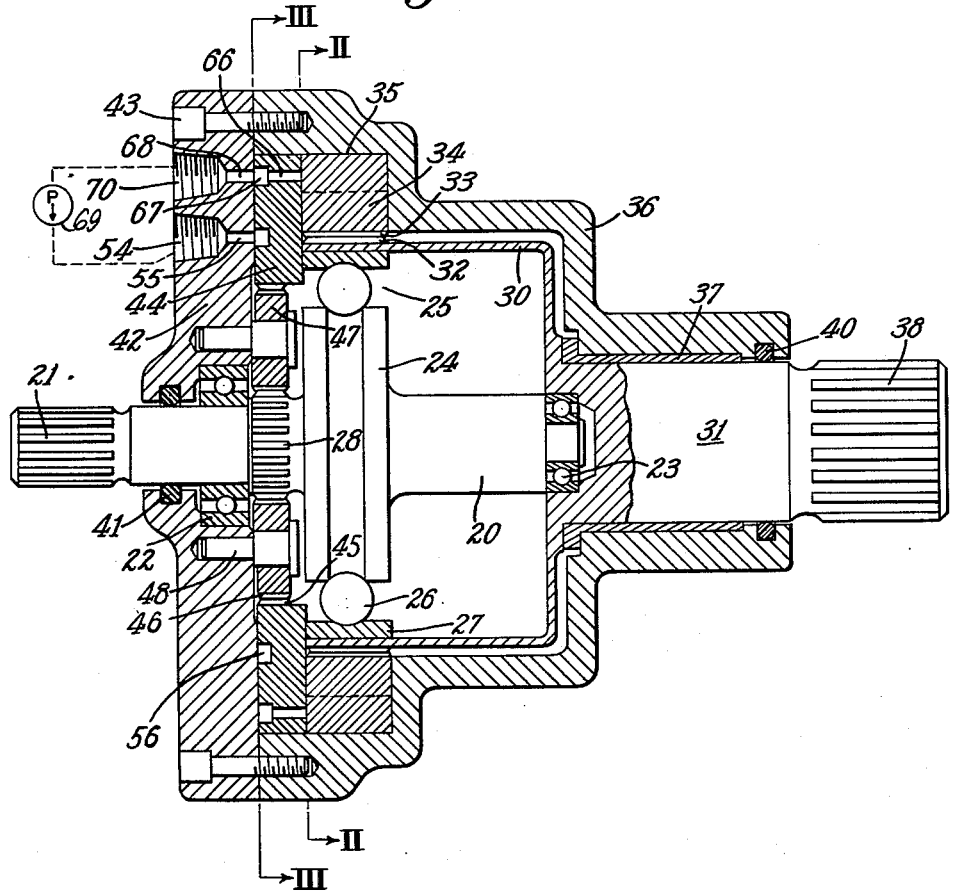
FIGURE 1 is an axial section of a power steering device of the invention, showing the preferred embodiment.

The device of the invention in the preferred embodiment employs a harmonic drive rotary-to-rotary speed reducer in direct coupling in a power steering mechanism. Reducers of this character are described in U.S. Patents 2,906,143 and 2,959,065 issued on applications filed in my name.

In addition to the harmonic drive, the device of the invention incorporates a power assist feature which alters the mechanical ratio of the harmonic drive device.

Present power steering devices tend to assist only in reducing the manual torque required in the steering operation. For example, in present day automobiles the mechanical ratio between the steering wheel and the rotation of the spindle on the king pin varies between about 15:1 and 30:1. For power steering mechanisms presently in use the ratios are about 20:1. The lower ratios are used in lighter weight automobiles and in sports cars, and the higher ratios are used in heavier automobiles so that the driver will have sufficient physical strength to rotate the wheels. When power steering is used it would be desirable to have a lower gear ratio. However, if a gear ratio below 20:1 were incorporated in present designs, it would be impossible to steer the vehicle in the event that the hydraulic system failed. This is because the hydraulic system only acts as an assist and it provides all of the necessary power for steering over and above a certain minimum amount which is supplied by the hand of the driver. For example, it may require a pull of five pounds on the edge of the steering wheel in order to actuate a valve mechanism of the power steering device and then any additional effort is supplied by the power steering device.

Power steering devices are made in several different varieties. In the commonest form, an external cylinder and piston combination is connected between the frame of the car and the connection between the steering mechanism and the spindle of the car. In these devices there is a four-way valve which is spring loaded and when a certain effort is applied by the driver, this valve is moved in a specific direction and causes a flow of oil which tends to move the hydraulic piston.

There are other power steering devices which are built directly into the steering gear box and these usually employ a transverse piston which assists in turning the gear sector in the steering gear box.

In substance, however, all of these devices function in more or less the same manner. A spring loaded valve has spring pressure which is overcome by the manual operation of the steering wheel and when this valve is actuated, it causes the flow of oil against a piston which may be of the rotary or of the linear type to assist in the steering effort.

The hydraulic power for these devices is supplied by a separate pump which is usually driven by a V-belt connected to the crankshaft of an engine. Some of the newer power steering devices utilize a pump which is coaxial with the crankshaft and mounted on the front of the engine, driven directly by the crankshaft.

In all of these prior art power steering devices, it is necessary to use a gear ratio such that the automobile can be steered manually in the event of power failure or failure of oil supply. It is also necessary to keep in mind the possibility that the driver may not be a person of average strength. Hence, the gear ratio should not be made too small. It would be desirable to have a lower ratio to obtain greater speed in steering response since there is very much less motion of the steering wheel with a low gear ratio, and therefore it requires less motion of the steering wheel to turn a corner. Even though the possibility of failure of the power steering mechanism has been contemplated in present designs, a failure of the oil supply such as might be occasioned by a breaking of the belt or stopping of the engine, makes the car most difficult to steer particularly if it is travelling at low speed and is one of the heavier automobiles.

The power steering device of the invention operates entirely differently from those of the prior art. In the device of the invention the steering wheel is always directly and independently connected to the wheels on the road through a mechanical gearing system. In order to reduce the amount of effort and retain the desired feedback to the steering wheel, the gear ratio is made relatively large. If the device were strictly mechanical, it would require a greater number of revolutions of the steering wheel in order to turn a corner. However, in the device of the present invention the power assist lowers the gear ratio without in any way changing either the road sense of the steering mechanism, or the mechanical connection to the wheels on the road. This is true because there is always a mechanical gear connection between the wheels of the car and the steering wheel which is not self-locking.

Thus, summarizing what has been said before, in the prior art power steering devices the power varies the effort required to turn the steering wheel as far as torque is concerned, but in the device of the invention the power steering or power assist varies the effort required as far as motion is concerned. In both instances it requires less work for the driver, but in the prior art there is a marked change in torque between manual steering and power assist steering. In the device of the invention there is a marked difference in the amount of motion of the steering wheel required between manual steering and power assist steering. Therefore, in the event of power failure in the device of the present invention, a comparatively weak driver can continue to steer the automobile and no more torque is required than if the hydraulic system had not been disabled. However, in steering during a power failure it is necessary to move the steering wheel through a greater distance.

In the case of prior art power steering devices, this cannot be done, since in such devices a drastic increase in the amount of force is necessary when the power assist device is inoperative, making it difficult or impossible for a woman or a person lacking considerable strength to steer an automobile satisfactorily when the power steering device fails.

With prior art power steering devices a road sense or road feel assists only up to a certain torque level. Beyond that torque level the power assist device takes over completely, so that striking a curb a slight glancing blow or striking it vigorously is indistinguishable to the driver since both feel the same. Such, however, is not the case with the device of the present invention. The road feel in the device of the present invention is the same as with a prior art strictly mechanical steering device connected entirely by gearing which has no power steering feature. This is true whether or not the power function of the device of the invention is working.

Some of the advantages possessed by the device of the invention may be expressed as follows:

(1) In the device of the invention a lower overall gear ratio can be used, because the operation without the power assist does not dictate what overall gear ratio is permissible. The manual gear ratio can be made whatever is desired, and the lowering of the gear ratio with power assist can be made whatever is desired.

(2) In the device of the invention the same amount of force will steer the automobile whether or not the power assist is functioning. A frail person can then continue to steer the car notwithstanding that a power failure has taken place.

(3) The device of the invention has a true road "feel" and the amount of feedback or force is directly proportional to the road condition.

(4) Even where there is a power failure, there is a direct gear connection to the wheels in the device of the invention. In the prior art power steering devices, if the four-way valve fails, or if a relief valve fails, or if a hose line clogs, the entire system may become completely inoperative and it may be impossible to steer the car manually.

Figure 2:
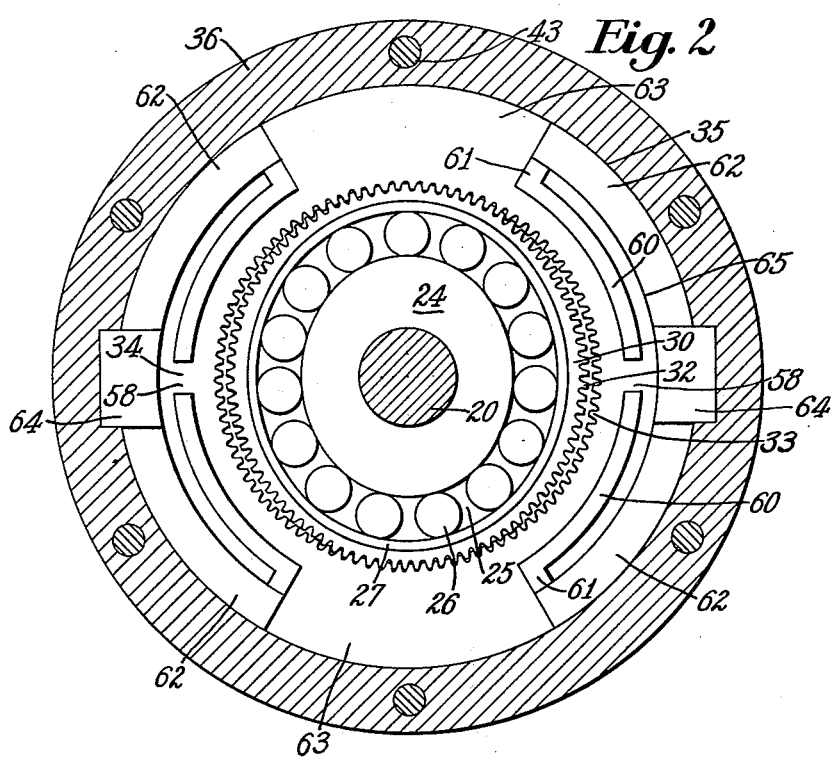
FIGURE 2 is a transverse section on the line II—II of the device of FIGURE 1.
Figure 3:
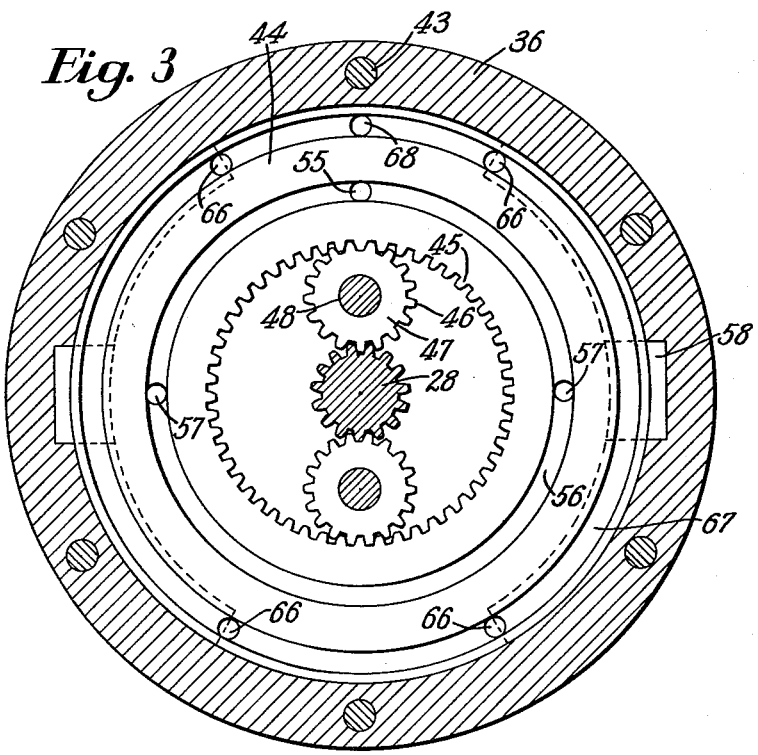
FIGURE 3 is a transverse section on the line III—III of the device of FIGURE 1.

Considering first the device of the invention as shown in FIGURES 1 to 3 inclusive, a rotary-to-rotary harmonic drive mechanism provides the basic gear ratio. In order to obtain a reduction of this ratio, a circular spline of this harmonic drive is connected to a power source so that the spline can rotate so as to increase the amount of motion of the output and as a result decrease the ratio.

The harmonic drive device itself may suitably be conventional. Input shaft 20 has at one end a spline 21 which is connected to the steering wheel of a vehicle, for instance an automobile, through a tube or steering shaft not shown. The input shaft 20 is mounted on two radial anti-friction bearings, suitably ball bearings, 22 and 23. Anti-friction bearing 22 is mounted in the cover plate of a housing later to be described and antifriction bearing 23 is mounted on the end of the output shaft later to be described.

Integral with the input shaft 20 is the inner race 24 of a wave generator 25. The inner race as disclosed in the harmonic drive patents above referred to, is provided with lobes, suitably two or three distributed around the circumference, the particular form shown having two lobes which are at diametrically opposite positions and form an elliptoidal shape on the inner race.

The inner race is surrounded with bearing rolling elements 26 of uniform diameter and while these may be rollers, they preferably will take the form of balls as shown. No effort has been made to complicate the drawing by showing the separator which usually will be used.

Surrounding the balls 26 is an elliptoidal outer bearing race 27. It will be evident that the inner race, the balls and the outer race comprise an elliptoidal ball bearing.

It will be understood, of course, that an elliptoidal inner race 24 is of such a size and shape that when the rolling elements 26 are interposed, it will cause the outer race 27 to be deflected into the elliptoidal shape having major and minor axes.

The input shaft 20 is provided with a suitably integral coaxial gear 28 which is used for the purpose of actuating the power valve as later explained.

The outer race 27 of the wave generator 25 is mounted in contact engagement all around within the end of flexspline 30. Flexspline 30 is in the shape of a cup and is shown as being integral with output shaft 31, although of course the flexspline 30 can be connected to the output shaft in any suitable way without making the two integral. Reference is made to the patents above referred to for various interconnections by which the rotation of the flexspline 30 may rotate the output shaft 31.

Around the outside of the lip of the flexspline 30 there are a set of external spline teeth 32 which are in mesh around the major axis with internal teeth 33 on the inside and in circular formation around circular spline 34. The interengagement of these teeth at the major axis can be seen in FIGURE 2 and here it can also be seen that the interengagement of these teeth becomes progressively less as you approach the minor axis and at the minor axis the teeth are fully out of mesh and disengaged, and at this point can freely rotate one in relation to the other so as to produce the output motion similar to that obtained in a usual rotary-to-rotary harmonic drive.

The teeth on the inside of the outer member, in this case the circular spline, are more numerous than the teeth on the outside of the inner member, in this case the flexspline, by a difference which is equal to or a multiple of the number of lobes on the wave generator, as well known in harmonic drive.

The circular spline 34 is mounted within an annular recess 35 in a housing 36. This is a close fitting circular recess and the housing engages the circular spline 34 in order to form a piston-cylinder arrangement having an interface between the two members which is essentially oil-tight. At the end of the housing 36 there is a projection in which a bearing 37 is mounted for the output shaft. The output shaft has a splined end 38 which connects to the arm which causes the front wheels on the road to be turned when the steering wheel is turned in order to steer the automobile. An oil ring lubrication seal 40 for the output shaft is provided and there is an oil ring lubrication seal 41 on the input shaft. The end of the housing 36 is closed by a cover 42 which is fastened to the housing 36 by a ring of cap screws 43.

Mounted between the cover 42 and the circular spline 34 there is an annular valve 44. This valve has various passageways so that it will function as a four-way valve in relation to the circular spline 34. On the inside of the annular ring valve 44 there is a circular set of internal teeth 45 which are intermeshed with the circular set of external teeth 46 on idler gears 47. These idler gears rotate on studs 48 and the teeth on the opposite sides of the idler gears mesh with the teeth on gear 28 on the input shaft 20. Thus, it can be seen that rotation of the input shaft 20 will cause the gear 28 to rotate the idler gears 47 which in turn will cause rotation of the annular valve 44. As explained below, the oil passages on the valve are so connected that wherever the valve ring 44 is caused to rotate the circular spline 34 will also rotate and follow it. In this sense wherever the valve ring 44 rotatatively leads, the circular spline 34 will rotatively follow.

The cover 42 has an inlet threaded hole 54 connected to an inlet port 55 extending through the cover. The inlet port 55 connects with an annular groove 56 which extends around the side of the valve 44 which is adjoining the cover 42. This is best seen in FIGURE 3. The annular groove 56 connects with holes 57 extending through the valve, these holes in neutral position being blocked by the circular spline at its closure portions 58 as shown in FIGURE 2. The holes 57 are at diametrically opposite positions as shown. Hence, oil that enters into the threaded inlet 54 and passes through the inlet port 55 enters the annular groove 56 and communicates through to the opposite side of the holes 57 drilled through the valve 44. Since, however, these holes are in neutral position directly over the closure portions 58 of the circular spline, the oil can at that time pass no farther. On either side of the closure portions 58 of the circular spline there are segmental inlet passages 60 which at the ends remote from the islands 58 communicate through side ports 61 with annular rotary cylinders 62. The rotary segmental cylinders 62 are defined at one end by radially extending outer portions 63 of the circular spline and are defined at the opposite end by stationary cylinder separators 64 which are mounted in and secured to the housing 36 and which have cylindrical surfaces engaging outer cylindrical portions 65 of the circular spline. On the radial outside the rotary cylinders 62 are defined by the cylindrical inner surface of the housing 36. At the end toward the output the cylinders 62 are defined by the housing 36 and at the end toward the input the cylinders 62 are defined by the valve 44.

It will be evident that in the position of the rotary valve 44, as seen in FIGURE 3, flow of oil will not be permitted beyond the inlet holes 57 because of the relative position of the islands 58 on the circular spline.

It is, however, desirable to have a flow of oil at all times even when the valve is "closed" so as to reduce the work which must be done by the hydraulic pump. As a consequence, it will in some cases be desirable to increase the diameter of the inlet holes 57 so that they slightly overlap the inlet grooves 60 or decrease the lengths of the islands 58 between the inlet grooves 60 so that there will be a continuous flow of oil through all of the inlet grooves 60 but there will be an equilibrium pressure between all of the rotary cylinders 62 when the valve is in neutral position. This practice is well known, for example, in power steering units and it is done solely to reduce the work required of the pump. The pump which supplies the fluid pressure may develop a pressure of approximately 1,000 p.s.i., but the four-way valve is so adjusted that the flow of oil through the orifices in the neutral position will generate a pressure of approximately 150 p.s.i. This explanation is given so that it will be appreciated that when the inlet flow is effectively closed, there may nevertheless be a circulation of oil if desired.

For the return flow of oil to the pump, oil will flow out of the rotary cylinders 62 through holes 66 in the ring valve 44 and into a circular outlet groove 67 in the ring valve 44 which communicates with outlet port 68 in the end plate 42 and with threaded outlet 70. A pump 69 supplies fluid through the inlet 54 and receives return fluid through the outlet 70.

In operation, if it be assumed that the input shaft 20 is turning so that the rotation of the gear 28 through the idlers 47 will cause the valve ring 44 to rotate a distance for example of 10°, this will rotate the openings 57 and the openings 66 in FIGURE 3 through an angle of 10°. Let us assume that this motion as viewed in FIGURE 3 is clockwise. It will then be evident that the hydraulic pressure entering through the threaded port 54 and the inlet port 55 and the annular inlet groove 56 will flow through the holes 57 into the inlet passages 60 and the inlet passages 61 and communicate with the interiors of two of the rotary cylinders 62. These will be the rotary cylinders located approximately at the 10 o'clock and the 4 o'clock position. Hence, oil pressure will be set up in these two rotary cylinders 62 and this oil pressure will be between the circular recess 35 on the interior of the housing, the cylindrical portions 65 in the circular spline 34, the ends of the radial projections 63 in the circular spline and the ends of the separators or seals 64 between the cylinders. In the meantime, the outlet ports 66 have also been rotated 10° clockwise and this then closes two of the outlet ports 66 when they encounter and are sealed by the radial projection 63 on the circular spline. The other two outlet ports 66 will be communicating with the two rotary cylinders 62 and hence the oil from these cylinders can flow through these two outlet ports 66 into the annular outlet groove 67 and out through the outlet port 68 and the threaded outlet hole 70. The condition by which one set of cylinders is connected to the inlet and the other set of cylinders is connected to the outlet may cause the circular spline to rotate until the relationship of the radial projections 63 on the circular spline in relation to the holes 57 and 66 on the valve will be that of FIGURES 2 and 3.

However, the valve plate 44 and the circular spline 34 will by this time have rotated through an angle of 10° clockwise. In similar manner any movement of the input shaft will cause a corresponding angular movement of the circular spline 34.

The amount of motion between the input shaft 20 and the circular spline will, of course, be regulated by the ratio of the gear 28 with respect to the gear 45 on the inside of the valve ring 44. For example, if there are eight times as many teeth on the valve ring 44 as there are on the gear 28, then the valve ring 44 will move one-eighth as many degrees as the input shaft. Therefore, by a judicious selection of the relationship of these two gears, the ratio of the power assist feature of the device can be selected. Of course, the ratio of the harmonic drive will be selected according to the principles set forth in the harmonic drive patents above referred to.

It should be obvious, of course, that the circular spline 34 can be positively held in place by hydraulic pressure actuated detents which will not permit rotation of the circular spline until the oil pressure reaches a value that will assure positive operation. This will provide an additional protection and permit continued mechanical operation when a hydraulic failure occurs.

Figure 7:
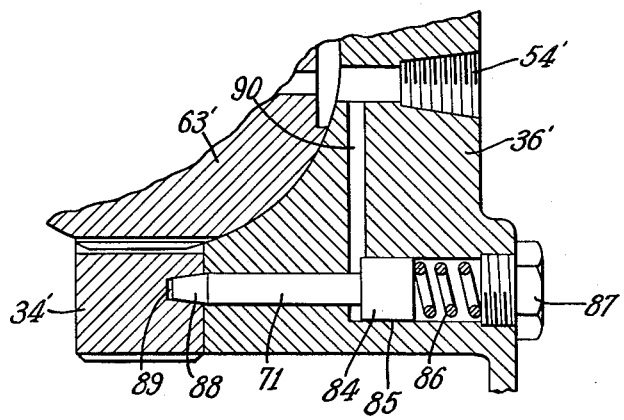
FIGURE 7 is a cross-sectional view of an alternate design of FIGURE 4 incorporating a hydraulically actuated locking means.

A detent of this type is illustrated in FIGURE 7 shown adapted to the version illustrated in FIGURE 4. Here, a detent 71 having an enlarged piston portion 84 fitting into a cylindrical cavity 85 in the housing 36' is held into engagement with the circular spline 34' by the spring 86 and the cap plug 87. The tapered engagement end 88 of the detent 71 fits into one or more tapered holes 89 in the circular spline 34'. This locks the circular spline 34' against rotation when there is insufficient oil pressure.

However, when sufficient oil pressure is supplied to port 54', the communicating passageway 90 transfers this pressure to the cylindrical cavity 85 and, due to the enlarged piston 84, withdraws the detent 71 from engagement with the circular spline 34'. The circular spline is then free to rotate.

Figure 5:
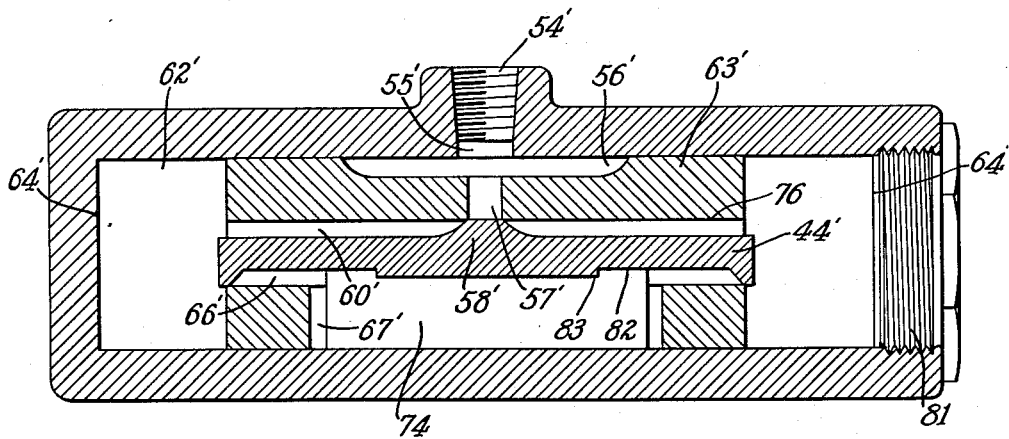
FIGURE 5 is a section on the line V—V of FIGURE 4.

FIGURES 4 and 5 show an alternate version with all of the parts serving the same functions but with a different design, the corresponding parts having similar numbers but with primes attached. The cover plate 42' serves the function previously described. The piston which is indicated as 63' is tangential to the circular spline and similar in function to the radial extension 63, but instead of being part of the circular spline it moves to and fro with it by interconnection of rack teeth 72 on one surface of the piston 63' with a circular set of gear teeth 73 on the outside circumference of the circular spline 34'.

The idler gear 47' connects with a valve actuator plate 74 which has rack teeth 75 on the surface engaging the idler gear. The valve actuator 74 causes the slide valve 44' to move back and forth in a cylindrical opening 76 at the center of the piston and serves as a follower four-way valve for the piston.

The piston 63' causes the motion of the circular spline through its rack teeth as described. An O-ring seal 77 is provided between the cover plate 42' and the housing 36'. The cap screws which hold the cover plate to the housing are not shown in this view because they are not sectioned in the particular section.

FIGURE 5 illustrates the action of the four-way valve. The hydraulic inlet 54' connects by a passageway 55' to the slot 56' in the side of the piston 63'. This slot allows the connection of the inlet port 54' to the valve port 57' throughout the entire stroke of the piston 63'. The valve 44' has a cylindrical portion 58' of sufficient length to essentially close the valve port 57' allowing only sufficient leakage of hydraulic fluid to prevent overloading the pump. Passageways 60' are on each side of the cylindrical portions 58' to allow fluid communication with their respective cylinders 62'. Exhaust or outlet grooves 66' are opposite the passageways 60'. These are arranged so that they function as valves with the central hole 76 in the piston and the end of the piston 63'. The valve actuator plate 74 is fitted into these outlet grooves 66' at 82 and held in axial relation thereto by the tangs 83.

When the input shaft 20 is rotated, the gear 28 through the idler gear 47' causes an axial shift of the valve actuator plate 74. This shifts the cylindrical portion 58' in relation to the valve port 57' and allows hydraulic fluid under pressure to flow from inlet port 54' through passageways 55', 56', 57' and 60' into a cylinder 62', at the same time movement of the valve actuator plate 74 and the valve 44" brings about communication of the opposite cylinder 62' with the outlet passageway 66'. The hydraulic fluid is then free to flow over the idler gear 47' and throughout the entire harmonic drive mechanism to the outlet port 79'. This provides lubrication for all parts. As the hydraulic fluid flows in the above fashion, it causes the piston 63' to move in the direction of the originating movement of the valve actuator plate 74 until the cylindrical portion 58' is centered over the valve port 57'. Movement of the piston 63' produces rotation of the circular spline 34' as in the preferred embodiment above.

In FIGURE 6 the relationship of the manual operation with the power assist operation has been plotted. The ordinate is degrees of input and the abscissa is degrees of output. It can be seen that the manual operation illustrated by line 78 has an entirely different slope from the power assist illustrated by line 80. The graph of FIGURE 6 is based upon the assumption that the manual gear ratio is approximately 50:1 and the power assist gear ratio is approximately 18:1.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a power steering device, a gearing device comprising a circular spline having circularly disposed gear teeth, a flexspline cooperating with the circular spline and having gear teeth which are in contact with the gear teeth of the circular spline at a plurality of circumferentially spaced points with intermediate points at which the teeth on the flexspline are out of mesh with the teeth on the circular spline, the circular spline and the flexspline being one within another, the teeth on the external one of the circular spline and the flexspline being more numerous than the teeth on the internal one by a number equal to or a multiple of the number of circumferentially spaced points at which the teeth are in contact, a wave generator on the side of the flexspline remote from the circular spline and having a plurality of lobes which deflect the flexspline into mesh with the circular spline, the number of points of mesh of the flexspline with the circular spline being equal to or a multiple of the number of lobes on the wave generator, an input shaft operatively connected to one of the three aforesaid parts of the gearing device, namely, the circular spline, the flexspline, and the wave generator, an output shaft operatively connected to another of the three aforesaid parts of the gearing device, the third of the three aforesaid parts not connected either to the input shaft or the output shaft being normally stationary to serve as a reaction means for that one of the circular spline, the flexspline and the wave generator connected to the output shaft, and means responsive to a motion of the input shaft for driving said normally stationary element in a direction which will increase the resultant motion of the output shaft.

2. A power steering device of claim 1, in which the means for driving said normally stationary element comprises fluid actuated means operatively connected thereto, and valve means responsive to the motion of the input shaft for controlling said fluid actuated means.

3. A power steering device of claim 1, in which said means for driving said normally stationary element comprises fluid cylinder means interconnected with said normally stationary element and valve means interconnected with said input shaft for controlling said fluid cylinder means.

4. In a power steering device, a normally stationary circular spline having teeth in circular arrangement on its inner surface, a flexspline within the circular spline having teeth on the outside which are in contact with the teeth on the circular spline at a plurality of circumferentially spaced points with intermediate points at which the teeth are out of contact, the teeth on the circular spline being more numerous than the teeth on the flexspline by a number which is equal to or a multiple of the number of circumferentially spaced points at which the teeth are in contact, an output shaft connected to said flexspline and adapted to provide steering output, a wave generator within the flexspline having lobes which deflect the flexspline to bring its teeth into contact with the circular spline at the plurality of spaced points, an input shaft connected to the wave generator and adapted to receive steering input, and means interconnected with the circular spline for turning the circular spline, in response to motion of the input shaft, in a direction which will increase the motion of the output shaft over what would be its output when said means is stationary.

5. A power steering device of claim 4, in which the means for turning the circular spline comprises fluid actuated means interconnected with the circular spline and valve means for controlling the fluid actuated means and operatively interconnected with the input shaft.

6. A power steering device of claim 5, in which said means for turning the circular spline comprises rotary fluid actuated cylinder means interconnected with the circular spline and valve means controlling said cylinder means and actuated by said input shaft.

7. In a power steering device, in combination with a steering input shaft for receiving steering input and a steering output shaft for distributing steering output, a circular spline having circularly distributed spline teeth on its inner surface, said circular spline being normally stationary and being mounted for rotation, a flexspline having teeth around its outside which cooperate with the teeth on the circular spline, the flexspline teeth being in mesh with the circular spline and in contact with the teeth on the circular spline at two diametrically spaced points with intermediate points at which the teeth on the flexspline are out of mesh with the circular spline, the circular spline being connected to said output shaft, wave generator means inside the flexspline deflecting the flexspline into contact with the circular spline, the circular spline, the flexspline and the wave generator means all having a common axis, and the teeth on the circular spline being more numerous than the teeth on the flexspline by two or a multiple thereof, the wave generator means being interconnected to the input shaft, fluid actuated cylinder means interconnected to the circular spline for rotating the circular spline from its normally stationary position, a valve driving gear on the input shaft, a valve idling gear interconnected with the valve driving gear and radially outside the valve driving gear, and a valve having gear teeth interconnected to the valve idling gear and having passages which when the input shaft turns in one direction and the valve moves in a corresponding direction will energize the fluid cylinder means to move the circular spline in a direction which will increase the motion of the output shaft in that direction.

8. A power steering device of claim 7, in which said fluid cylinder means comprises rotary fluid cylinders acting on said circular spline.

9. A power steering device of claim 7, in which said fluid cylinder means comprises a fluid cylinder and piston tangential to said circular spline and means interconnecting said piston to said circular spline.

References Cited in the file of this patent

UNITED STATES PATENTS

| | | |
|---|---|---|
| 2,362,930 | Robbins | Nov. 14, 1944 |
| 2,796,945 | Dye et al. | June 25, 1957 |
| 2,931,239 | Dietrich | Apr. 5, 1960 |
| 3,033,051 | Reinke et al. | May 8, 1962 |
| 3,039,324 | Waterfield | June 19, 1962 |
| 3,058,372 | Robinson | Oct. 16, 1962 |